Oct. 4, 1927.  1,644,433
C. B. HUDSON ET AL
VULCANIZER
Filed Dec. 3, 1926
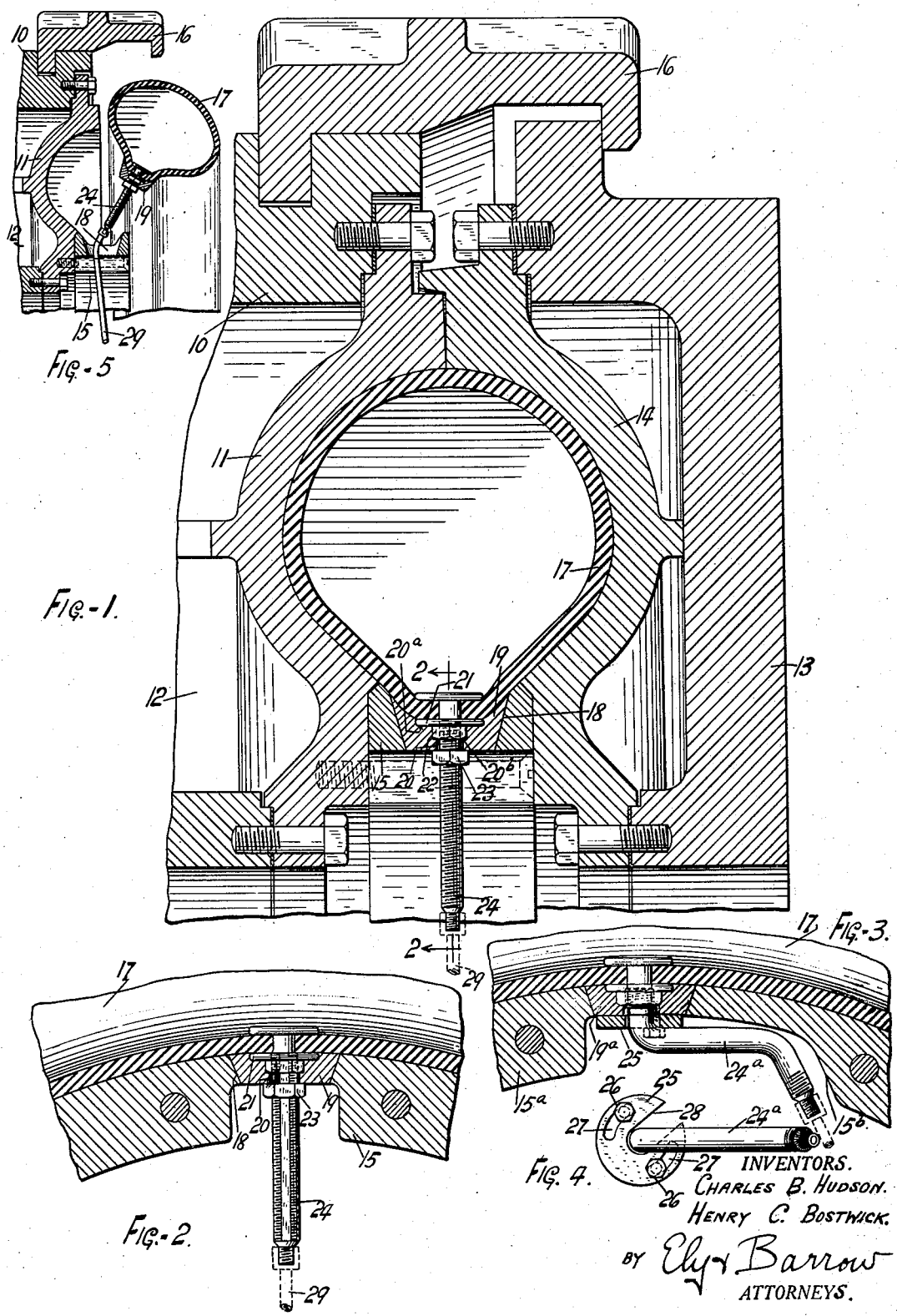

Patented Oct. 4, 1927.

1,644,433

UNITED STATES PATENT OFFICE.

CHARLES B. HUDSON, OF AKRON, AND HENRY C. BOSTWICK, OF KENMORE, OHIO, ASSIGNORS TO THE AKRON STANDARD MOLD COMPANY, OF AKRON, OHIO, A CORPORATION OF OHIO.

VULCANIZER.

Application filed December 3, 1926. Serial No. 152,388.

This invention relates to vulcanizing molds such as used in watchcase vulcanizers or other vulcanizers having relatively movable mold sections for curing inner tubes or other annular articles.

The general purpose of the invention is to provide an improved means for quickly mounting inflatable, annular rubber articles in vulcanizers, whereby to prevent localized searing of the surface of the article against the hot surfaces of the molds before the article is fully enclosed by the molds and inflated to expand it against the mold surface.

The foregoing and other purposes are attained by the construction illustrated in the accompanying drawings and described below. It is to be understood that the invention is not limited to the specific form thereof shown and described.

Of the accompanying drawings,

Figure 1 is a radial section through the cooperating sections of a watchcase vulcanizer having an inner tube in position for vulcanization therein;

Figure 2 is a detail section on line 2—2 of Figure 1;

Figure 3 is a similar view showing equipment for molding tubes having S-valves therein;

Figure 4 is an inner plan view of the construction shown in Figure 3; and

Figure 5 is a radial section illustrating the manner of mounting the tube.

Referring to the drawings, 10 represents the central section of a watchcase vulcanizer to which is removably secured a mold section 11 heated by steam led into a cavity 12 in section 10. Hinged for movement to or from cooperation with section 10 of the vulcanizer is a section 13 on which is removably secured a mold section 14 arranged to cooperate with mold section 11.

For molding inner tubes or other inflatable articles, an inner tube supporting ring 15 is provided, preferably of integral construction and preferably secured to the inner section 11. A locking ring 16 is shown for securing the sections 10 and 13 together during vulcanization.

To provide for quickly mounting the tube shown at 17 on the ring 15 the latter is formed with a comparatively large, inwardly tapered valve aperture 18 in which a valve plug 19 is arranged removably to seat. Plug 19 is formed with a valve aperture 20 so shaped as to provide a shoulder $20^a$ for seating the clamping washer 21 of the inner tube valve and a shoulder $20^b$ for seating the clamping nut 22 of the tube valve. A nut 23 is arranged to be threaded onto the barrel of a straight valve 24 to secure the plug 19 to the valve.

In equipment for S-valves, the ring $15^a$ is cut away as at $15^b$ to clear the valve $24^a$. To secure the plug $19^a$ to the valve $24^a$, a locking plate 25 is rotatably mounted on the plug $19^a$ by bolts 26, 26 engaged through arcuate slots 27, 27, the plate 25 having a radial slot 28 therein adapted in one position to permit the mounting of the plug $19^a$ on the valve, the plate 25 being rotatable to a position, as shown in Figure 4, such as to engage the circumferentially directed shank of the S-valve to clamp the plug $19^a$ thereon.

The mounting of the tube 17 in the vulcanizer is illustrated in Figure 5. The plug 19 is first secured to the valve as shown and the valve inserted through aperture 18 sufficiently to connect a fluid pressure supply line 29 for inflating the tube. The tube is then quickly mounted in place on ring 15, plug 19 finding its seat in aperture 18, the vulcanizer being closed and locked and the inflation pressure immediately supplied to the tube in a minimum period of time, localized searing of the tube being avoided.

Modifications of the invention may be resorted to without departing from the spirit thereof or the scope of the appended claims.

What is claimed is:

1. A watchcase vulcanizer for use in curing annular, inflatable articles, said vulcanizer including a stationary heated section and a hinged heated section movable into cooperation therewith, mold sections respectively supported on the sections, an integral ring secured on the stationary mold section for supporting the inner periphery of the article and having a comparatively large, inwardly tapered valve aperture therethrough, a plug adapted to fit in said aperture, means for securing the plug to the valve stem of said article, and means for locking the vulcanizer sections together.

2. A vulcanizer for use in curing annular, inflatable articles, said vulcanizer including relatively movable heated sections, mold sections respectively supported on the sections, a ring secured on one mold section for supporting the inner periphery of the article and having a comparatively large, inwardly tapered valve aperture therethrough, a plug adapted to fit in said aperture, means for securing the plug to the valve stem of said article, and means for locking the vulcanizer sections together.

3. A steam backed mold construction for curing annular, inflatable articles, including separable mold sections each backed by steam chambers, a ring for supporting the inner periphery of the article between the sections and having a comparatively large, tapered aperture therethrough, and a plug for said aperture adapted to be secured to the inflating valve of said article.

4. A steam backed mold construction for curing annular, inflatable articles having S-valves thereon, including separable mold sections each backed by steam chambers, a ring for supporting the inner periphery of the article between the sections and having a comparatively large, tapered aperture therethrough, a plug for said aperture adapted to be secured to the inflating valve of said article, and means for securing the plug to said valve including a rotatable clamping plate mounted on the plug and adapted to pass over the shank of the S-valve and then to be rotated into engagement with the shank thereof.

5. A mold for curing annular, inflatable articles including a member for supporting the inner periphery of the article, said member having an enlarged aperture therethrough and a plug having a passage and for fitting the aperture, said plug being adapted to be fitted around and secured to the valve.

CHARLES B. HUDSON.
HENRY C. BOSTWICK.